(12) United States Patent
Salk

(10) Patent No.: US 7,762,660 B2
(45) Date of Patent: Jul. 27, 2010

(54) CLIP FOR RELEASABLY ATTACHING CLIP-ON ACCESSORY TO EYEGLASSES

(76) Inventor: David E. Salk, P.O. Box 8550, Emeryville, CA (US) 94662

( * ) Notice: Subject to any disclaimer, the term of this patent is extended or adjusted under 35 U.S.C. 154(b) by 0 days.

(21) Appl. No.: 12/286,028

(22) Filed: Sep. 25, 2008

(65) Prior Publication Data

US 2009/0086156 A1 Apr. 2, 2009

Related U.S. Application Data

(60) Provisional application No. 60/995,831, filed on Sep. 27, 2007.

(51) Int. Cl.
*G02C 9/00* (2006.01)
(52) U.S. Cl. .......................... 351/47; 351/57
(58) Field of Classification Search .................. 351/47, 351/110, 57, 48, 58, 124, 41, 158
See application file for complete search history.

(56) References Cited

U.S. PATENT DOCUMENTS 5,889,574 A * 3/1999 Gandl-Schiller ............. 351/47
5,936,702 A * 8/1999 Cheong ....................... 351/141
5,953,096 A 9/1999 Friedman
6,234,628 B1 5/2001 Friedman
6,302,538 B1 10/2001 Friedman
6,354,702 B2 * 3/2002 Via' .............................. 351/47
6,398,362 B1 * 6/2002 Masunaga .................... 351/47
6,557,997 B1 * 5/2003 Sieberg ....................... 351/47
6,607,270 B2 8/2003 Feldman
6,685,314 B1 2/2004 Friedman

* cited by examiner

*Primary Examiner*—Hung X Dang
(74) *Attorney, Agent, or Firm*—Howard Cohen

(57) ABSTRACT

A customizable clip-on accessory for spectacles includes a pair of auxiliary lenses, and clasps for engaging the lenses to join them to a bridge member and to releasably engage the spectacles. The clasps include a pair of parallel posts engagable by a fastener member having a pair of cylindrical lugs with bores extending therethrough to receive the posts in permanent fashion. The lens is drilled with hole to accept the lugs, and the posts are inserted through the bores and trimmed. A tongue extends from each clasp, and may be bent and trimmed to engage the periphery of the spectacles. Alternatively, the tongue may have a tab end that engages a bracket member provided with spaced apart flanges to engage the periphery of the spectacles. The bracket member may also be used with a clamping fastener that has a toothed edge to engage an edge portion of the auxiliary lens.

13 Claims, 7 Drawing Sheets

CLIP FOR RELEASABLY ATTACHING CLIP-ON ACCESSORY TO EYEGLASSES

CROSS-REFERENCE TO RELATED APPLICATIONS

This application claims the benefit of the filing date of U.S. Provisional Application 60/995,831, filed Sep. 27, 2007.

FEDERALLY SPONSORED RESEARCH

Not applicable.

SEQUENCE LISTING, ETC ON CD

Not applicable.

BACKGROUND OF THE INVENTION

1. Field of the Invention

This invention relates to a clip-on accessory having a pair of lenses, which may be either filter or powered lenses that are held in registration with a spectacle frame, and which fit directly over the frame. Specifically, the invention resides in the ability of the lens clasp and method of attachment that is utilized in the clip to accommodate a variety of lens thicknesses in a single design. This represents a significant improvement over previous designs.

2. Description of Related Art

Traditionally, a pair of eyeglasses is prescribed with powered lenses to correct optical defects of the human eye. The lenses may be fitted into a variety of frame materials, designs, and shapes. Metal, plastic and rimless frames are the most commonly used in the industry. Due to the high cost of prescription sunglasses, consumers often find it appealing to use clip-on sunglasses in order to protect their eyes from the harmful rays of the sun, and to improve vision in high glare situations and the like. The large variety of frame technologies presents an opportunity for custom-made clip-on sunglasses that can be designed to accommodate a wide range of frame designs and shapes. However, most eyeglass frame designs do not come with a clip-on that is made especially for that specific style of frame. The use on non-prescription, or plano, lenses in clip-on sunglasses allows the wearer to sue the optical properties of the clear lenses that are in their eyeglasses in conjunction with the filtering properties of the clip-on lenses, without influencing the visual acuity derived from the prescription lenses. This arrangement permits a more economical solution to the wearer of prescription eyeglasses, who wants protection from the harmful rays of the sun, or desires to modify the functionality of the prescription eyeglasses by using a powered lens in the clip-on accessory. This arrangement avoids the cost of purchasing a second frame and prescription lenses.

For the purposes of discussion and description, the term filter lens will be used to describe lenses that are used on the clip-on to filter certain wavelengths of light and/or to reduce the amount of visible light. As most frames are not available with a clip designed specifically from the frame, custom made clip-on sunglasses are popular because they allow consumers to choose any frame they prefer, while availing themselves of the cost savings of clip-on.

While clip-on sunglasses are the most common form of clip-on accessory, clip-on may be used for other purposes as well, both functional and cosmetic. For example, a filter lens may be used in a clip-on to increase the contrast that could enhance night vision for driving. Shooting glasses often have a yellow tint and a clip-on could be substituted for a pair of prescription yellow lenses to reduce the cost to the user. Another use of clip-on involves the use of powered lenses in the clip-on to alter the functionality of the prescription lenses they are mounted upon. For example, the use of personal computers has become commonplace, and yet the use of eyewear that is designed for computer use is relatively rare. The distance between a computer screen and the user's eyes can put a strain on the visual system. Computer eyewear can be designed to properly correct the wearer's vision for the distance from the eyes to the screen. Most people over the age of 35 will benefit from such eyewear. The cost of having a separate pair of spectacles may prevent some consumers from availing themselves of having the best possible vision when using a computer. However, a clip-on accessory that supports lenses that change the focal distance of the wearer's primary pair of glasses is a useful and economical alternative.

As the invention permits the use of various thicknesses of lenses, it should be noted that this is a distinct advantage over prior designs that cannot accommodate different thicknesses due to limitations of the clips or the overall design.

It should also be noted that the previous designs of clip-on do not specify the use of specific curvatures of lenses in order to achieve a perfect fit. The use of a single base curve lens in a variety of frame designs permits unwanted light to enter the gaps between the clip-on and the frame. This unwanted light is distracting and can be uncomfortable to the wearer. Our invention specifies the use of lenses that are selected to match the curvature of the frame to provide the finest possible fit, thereby preventing unwanted light from entering the wearer's eyes.

BRIEF SUMMARY OF THE INVENTION

The main object of the invention is to provide a clip-on accessory for a pair of eyeglasses. As described previously, these clip-on are custom made for the frame which they are intended to fit, and it is important that the clip fit as perfectly as possible to the frame, and that the clip be as easy as possible to use for both the optical trade and the consumer. This invention addresses the deficiencies of prior designs by providing the optical trade with a product that is far more versatile and therefore easy to use than previous designs of custom clips. For the consumer, the product is designed to provide a perfect fit. The use of lenses that are matched to the curvature of the frame permit the assembled clip to fit more closely to the frame and provide a superior fit, compared to previous designs that use one base curve for all frames.

Additionally, many of the previous designs use a preformed prong to fit all frames. This is a serious design flaw, as eyeglass frames vary greatly in design and, in the case of rimless eyeglasses, the thickness of the edge of the lens, to which the clip is secured, varies greatly according to the corrective prescription. The invention uses both a custom "cut to fit" prong, or it can be supplied with a snap-on prong that is provided in a variety of sizes. This permits ease of assembly of the optician, while still providing the consumer with the best possible fit.

As mentioned previously, the major advantage of the invention is the ability of the invention to accommodate a variety of thicknesses of lenses, using a single component. This versatility represents a significant advance over previous designs. Previous designs have relied on a ledge to properly secure the lens into the clip. By using a locking socket that has a hole, and by eliminating the ledge, the invention permits the use of many different thicknesses of lenses, thereby offering greater choice to the consumer, without the optician incurring greater inventory costs.

The invention may be used with any design of eyeglass frame and will fit better than previous designs due to the use of custom base curves of filter lenses, exact shape matching, and custom prongs. The combination of these features, along with the invention's ability to accommodate lenses of different thicknesses, make the invention superior to previous designs.

To summarize, the advantages of the invention are:

1) The ability to accommodate lenses of different thicknesses in a single design;

2) The use of a variety of base curves in the filter lenses to achieve the best possible fit between the clip and the eyeglasses, eliminating unwanted light entering the eye;

3) The variety of prong designs that allow the clip to fit on a variety of eyeglass frame materials and styles, while providing the best possible fit;

4) The use of software to customize the shape of the filter lens to precisely match the outside conformation of the frame (which may deviate from the inside shape) to optimize the fit;

5) The use of curved bridge components to properly match the front curve of the frame.

DETAILED DESCRIPTION OF THE INVENTION

The present invention generally comprises a customizable clip-on accessory for eyeglasses. In general, it is comprised of the following elements: two auxiliary or filter lenses that are cut to the approximate size and shape of the outside of the eyeglass frame portions that secure the corrective lenses, four clasps, two of which are secured to a resilient bridge component, and four locking sockets to secure the clasps to the filter lenses. The clasps may include either a snap-on bracket that grips the spectacle frame, or a long tip that can be cut and formed into a prong that grips the edge of the frame or, in the case of a rimless frame, the lens, to hold the finished clip-on in registration with the spectacle frame.

Figure 1:
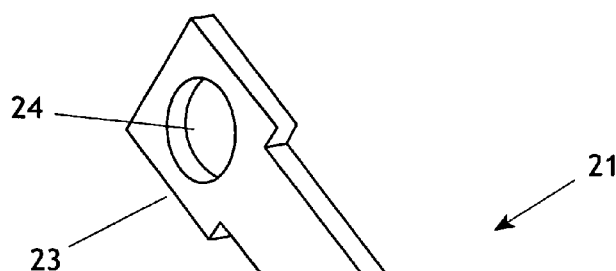
FIG. 1 is a perspective view of one embodiment of the clip for a clip-on eyeglasses accessory of the present invention.
Figure 2:
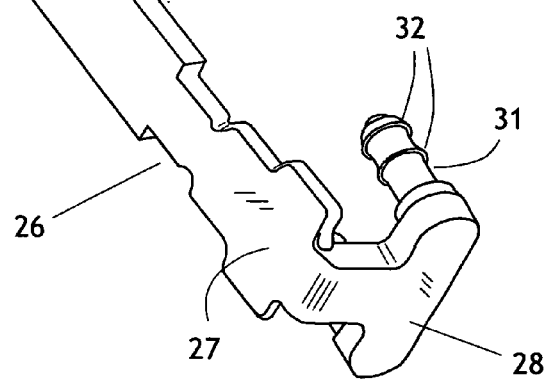
FIG. 2 is a plan view of the clip depicted in FIG. 1.
Figure 2:
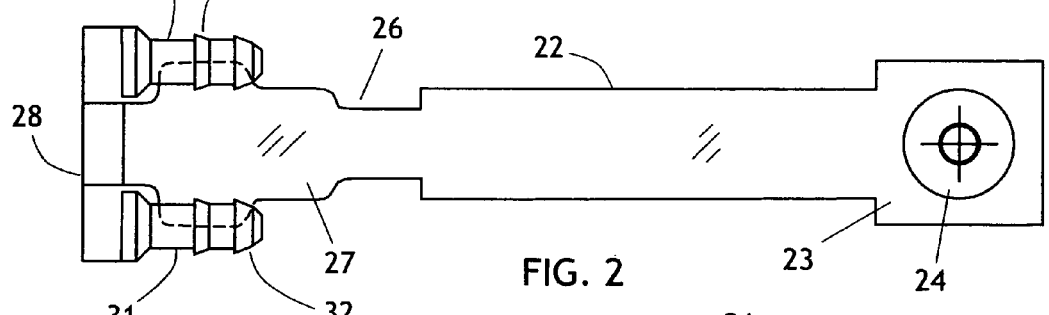
Figure 3:
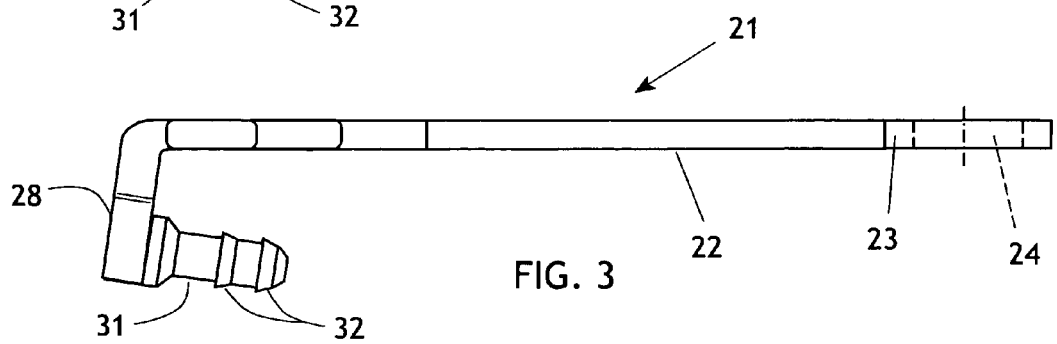
FIG. 3 is a side elevation of the clip shown in FIGS. 1 and 2.
Figure 4:
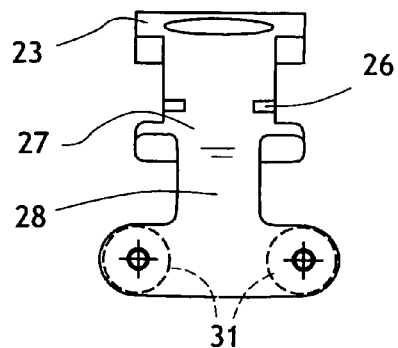
FIG. 4 is an end elevation of the clip shown in FIGS. 1-3.

With regard to FIG. 1, one embodiment of the invention includes a clasp 21 having an elongated tongue 22 with a distal end 23 comprising an wider rectangular portion. A circular opening 24 extends through the distal end. Adjacent to the proximal end of the tongue 22, there is a reduced width waist 26, and a wider land portion 27. A T-shaped front plate 28 extends integrally from the proximal end of the clasp at an angle slightly less than 90°, as shown in particular in FIG. 3. A pair of posts 31 extend distally from the opposed wings of the T-shaped front plate 28, the posts aligned parallel to each other and including tapered annular flanges 32 that provide a barb-like effect, as described below.

Figure 6:
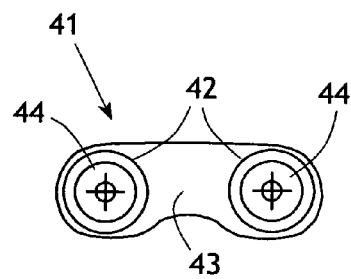
FIG. 6 is a front elevation of the clasp component of the embodiment of FIGS. 1-5.
Figure 7:
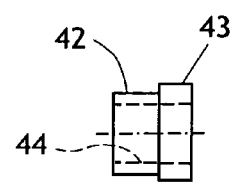
FIG. 7 is an end elevation of the clasp component shown in FIG. 6.

With reference to FIGS. 6 and 7, a further component of the embodiment is a fastener component 41. The fastener component includes a pair of tubular cylindrical lugs 42 extending in spaced apart, parallel relationship, and joined by a panel 43. Each lug 42 includes a bore 44 extending axially therethrough. It may be appreciated that the bores 44 are spaced apart the same distance as the posts 31, and the diameter of each bore 44 is dimensioned to be a mild interference fit with a post 31, particularly its flanges 32. Thus the embodiment is designed so that the posts 31 may be inserted into the bores 44 by direct force, and the posts will be permanently self-retaining therein.

Figure 8:
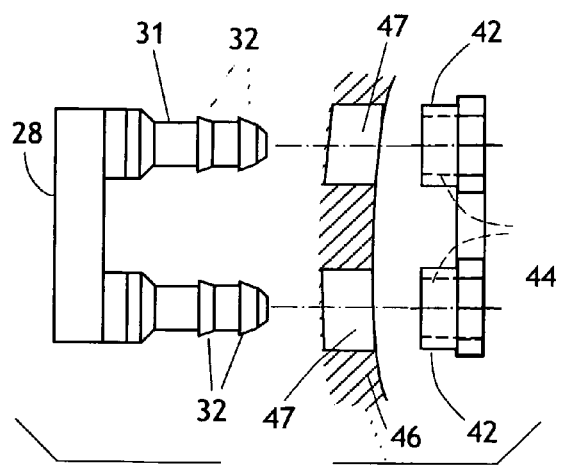
FIG. 8 is an enlarged fragmentary exploded view of the clip, clasp component, and clip-on lens in accordance with the present invention.
Figure 9:
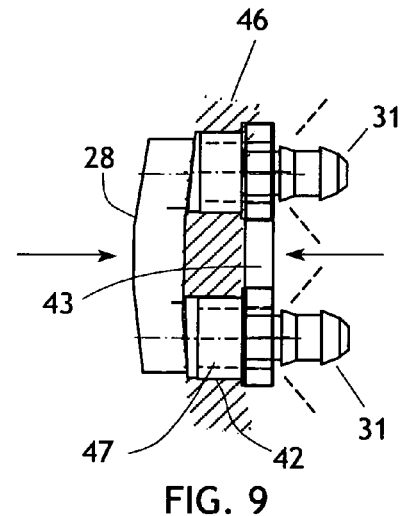
FIG. 9 is an assembled view of the components depicted in FIG. 8.

With reference to FIGS. 8 and 9, the clasp 21 and fastener 41 are designed to be joined and secured to a lens 46 (such as a filter lens and the like) of a clip-on accessory for eyeglasses. The lens 46 is provided with a pair of holes 47 spaced apart on the same centers as the posts 41 and bores 44 and extending through the lens adjacent to the edge thereof. The holes 47 are dimensioned to receive the outer diameter of the cylindrical lugs 42 in a close fit relationship. The holes 47 may be formed using a precision drilling machine, or a drill guide fitting or jig that is set to the spacing of the posts 31. Since virtually all clip-on lenses are fabricated of some form of plastic or polymer, such as polycarbonate, acetate, PMMA, or the like, drilling the holes 47 is not difficult for an optical technician.

The posts 32 are then inserted through the bores 44 of the fastener 41 by use of a manual or powered tool, such as a pliers or crimping tool, having converging jaws of a conformation suitable for handling the components and urging them together, as is known in the prior art. The result, as shown in FIG. 9, is that the clasp 21 is securely and permanently joined to the edge of the lens 46 by the fastener 41, with the proximal surface of the fastener 21 extending adjacent to the outer surface of the lens 46 and the tongue 22 extending distally toward the eyeglasses on which the clip-on accessory is supported. As indicated in FIG. 9, the portions of the posts 31 that protrude from the adjacent surface of the panel 43 may be clipped or cut off flush therewith.

It should be noted that the posts 31 are sufficient in length to extend at least entirely through the bore 44 and be permanently lodge fully therein. Thus any lens 46 of any thickness may be accommodated by the present invention.

Figure 10:
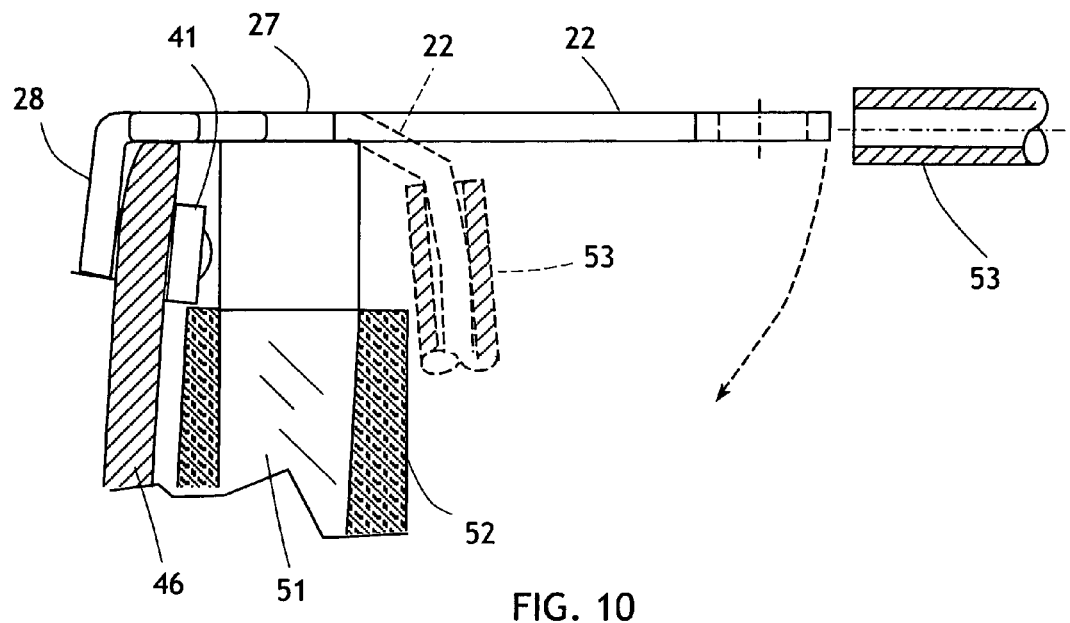
FIG. 10 is a magnified cross-sectional side elevation of the clip and clasp assembled to a clip-on accessory and placed on representative eyeglasses.

As shown in FIG. 10, the distal portion of the tongue 22 may be manipulated to obtain an optimal fit to the typical eyeglasses that includes a frame 51 supporting a corrective lens 52. The tongue may be covered with a soft sleeve that eliminates abrasion of the clasp on the lens 52. For example, a short length of heat shrink tubing 53 may be placed on the distal portion. The tongue may be bent one or more times and places to establish a grasping engagement of the clasp on the edge of the eyeglasses frame and/or lens, depending on the size and thickness of the frame, the thickness of the lens, and the style of the frame. The reduced width waist portion 26 of the tongue 22 aids in enabling bending of the tongue as required. Thus, as shown by broken line at reference numeral 54, the tongue is bent and insulated by sleeve 53, and sized and formed to impinge on the inner surface of the lens and the edge of the frame to define a gripping engagement of the edge of the eyeglasses.

Note that the lugs 42 act to distribute any stress generated by force applied incidentally to the tongue 22, so that the lens 46 is not subject to loading that would otherwise compromise its long-term durability.

Figure 13:
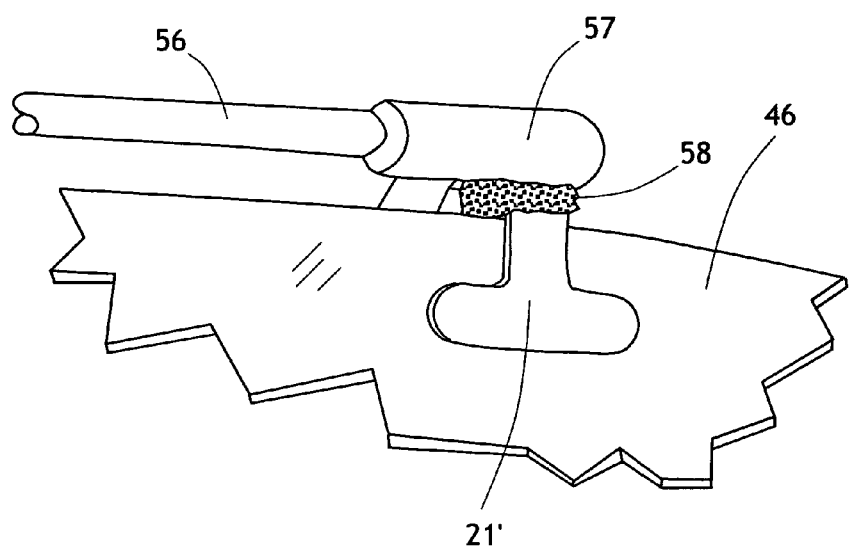
FIG. 13 is a magnified top view of a clip-on bridge component secured to a clip assembly of the present invention.
Figure 11:
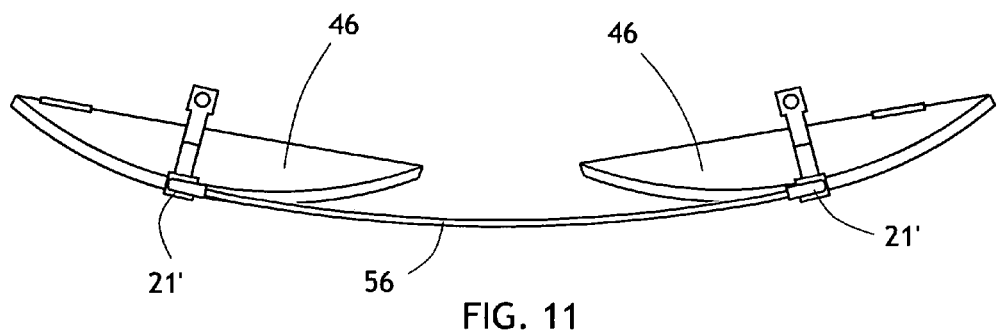
FIG. 11 is a top view of a clip-on accessory formed by the clasps and bridge component of the invention.
Figure 12:
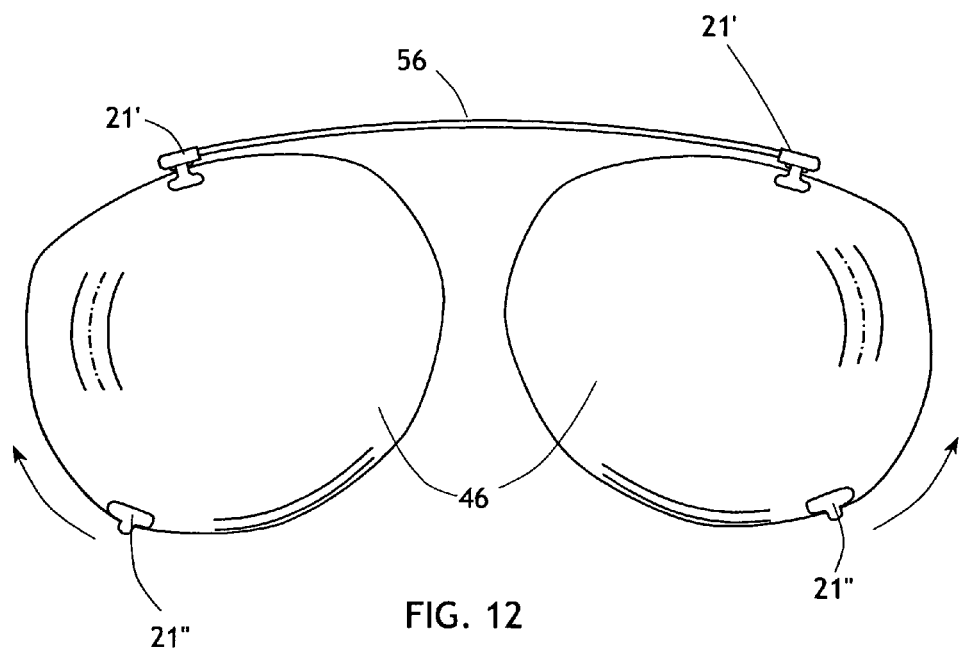
FIG. 12 is a front elevation of a clip-on accessory formed by the clasps and bridge component of the invention.

As is known in the prior art, a resilient bridge 56 is provided (FIGS. 11 and 12), attached at opposed ends to two of the clasps 21'. The bridge may be made from a material that is resilient and form-retaining, such as spring steel, shape memory wire or other metal, or a suitable plastic or polymer having similar properties. The opposed ends are secured in end caps 57, and the end caps are each soldered or spot welded (58) to the land portion 27 of a clasp 21', as shown in FIG. 13. This forms the top assembly, and the tension of the resilient bridge helps the clip maintain the proper position and securely attached to the frame. Note in the top view of FIG. 11 that the bridge is curved out of a vertically extending plane, and that the front view of FIG. 12 depicts the curvature of the bridge out of a horizontal plane. This compound curvature of the bridge in two dimensions assures that the lenses 21" must be rotated outwardly by flexing the bridge 56, as shown by the arrows of FIG. 12, thus assuring that the restoring force of the bridge will urge the lenses and their clasps 21' and 21" to move toward each other and grip the eyeglass frame edge. Likewise, the curvature shown in FIG. 11 enables the clip-on accessory to flex to accommodate the spectacle shape.

Figure 5:
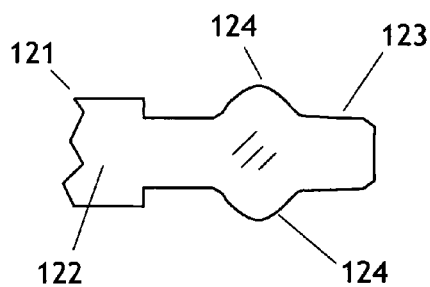
FIG. 5 is an enlarged fragmentary plan view of a further embodiment of the clip shown in FIGS. 1-4.
Figure 14:
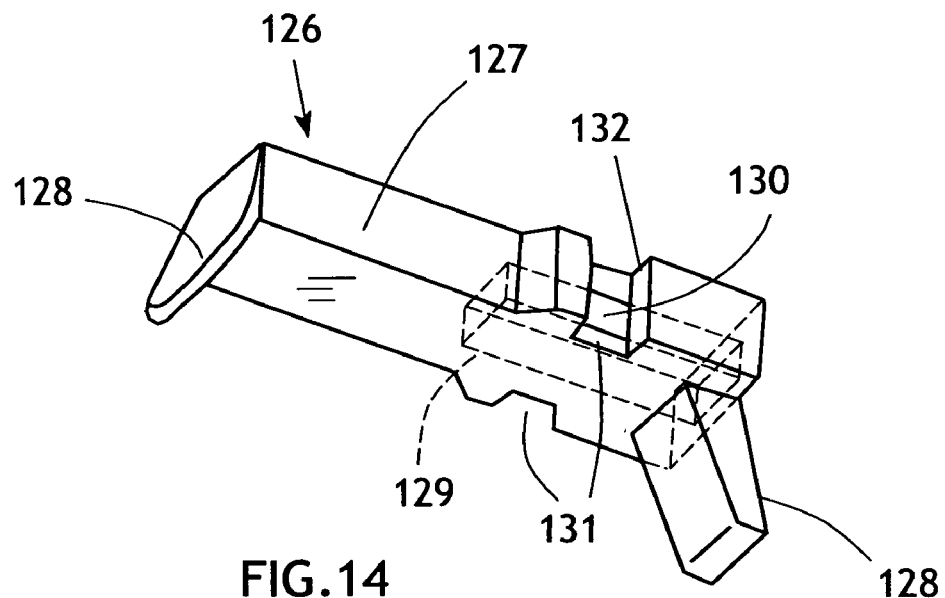
FIG. 14 is a perspective view of a further embodiment showing a bracket member for engaging an eyeglasses frame and lens.
Figure 15:
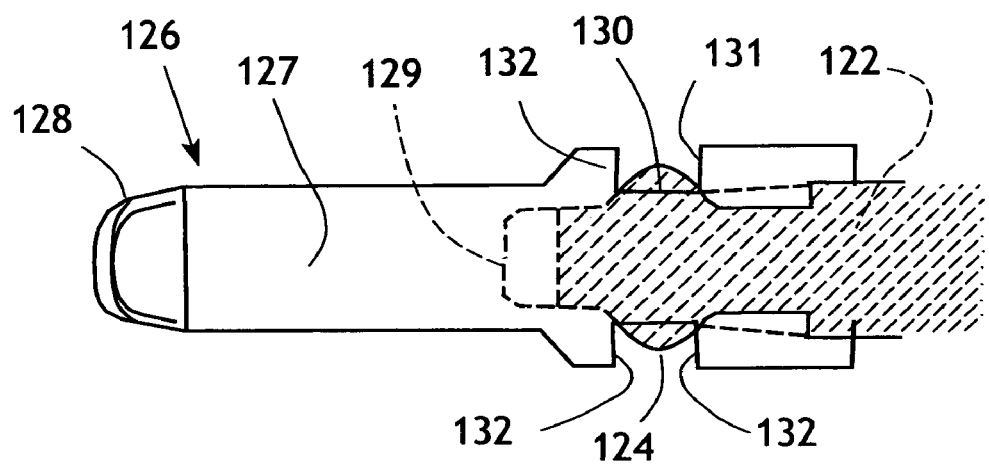
FIG. 15 is a bottom view of the bracket component of FIG. 14, showing its engagement with a tab structure of a clasp securable to a filter lens.

In a further embodiment of the invention, the tongue of the clasp component may carry out its eyeglasses-gripping function in a different manner. With regard to FIG. 5, the distal end of the tongue of the clasp 121 is foreshortened to define a tab 122 that is provided with a reduced width portion 123, and a pair of laterally opposed rounded detent lugs 124 extending laterally outwardly from the portion 123. With regard to FIGS. 14 and 15, this embodiment also includes a bracket component 126 having a bar-like elongated body 127 that features a pair of flanges 128 extending from opposed ends of the body 127. The flanges 128 extend in a common plane and diverge slightly outwardly each from the other. Opening into one end of the body 127 is a blind slot 129 that extends about half-way along the longitudinal axis of the component 127. A pair of cutouts 131 are formed in opposite sides of the body 127, and are sufficiently deep to communicate with the blind slot 129 and form side openings 130 therewith. Adjacent to the cutouts 131 the width of the bar-like shape is increased to form reinforced lands 132 straddling the openings. The slot 129 is configured in dimensions and tapered configuration to receive the tab 122 (cross-hatched for clarity in FIG. 15) in an interference fit, with the detent lugs snap-engaging in the openings 130 when the tab 122 is fully placed into the slot 129 in a permanent, rigid connection.

Thus the bracket component may be secured to the tab end of the clasp 121 that is installed at the edge of the filter lens of a clip-on accessory. The flanges 128 are spaced apart and angled to engage the edges of the eyeglasses frame and lenses, and the bracket 126 may be produced in various lengths and flange angles to accommodate various eyeglasses frame sizes and styles, as well as corrective lens thickness, and the like. These various sizes and configurations may be used universally with any clasp 121 having a tab 122 to engage the bracket components.

Figure 16:
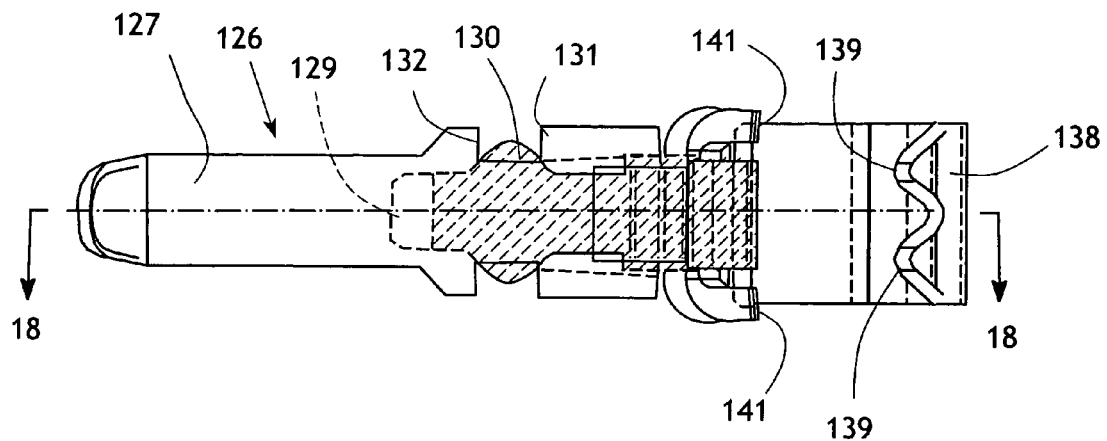
FIG. 16 is a bottom view of the bracket component of FIG. 14, showing its engagement with a tab structure of a clamping fastener securable to a filter lens.
Figure 17:
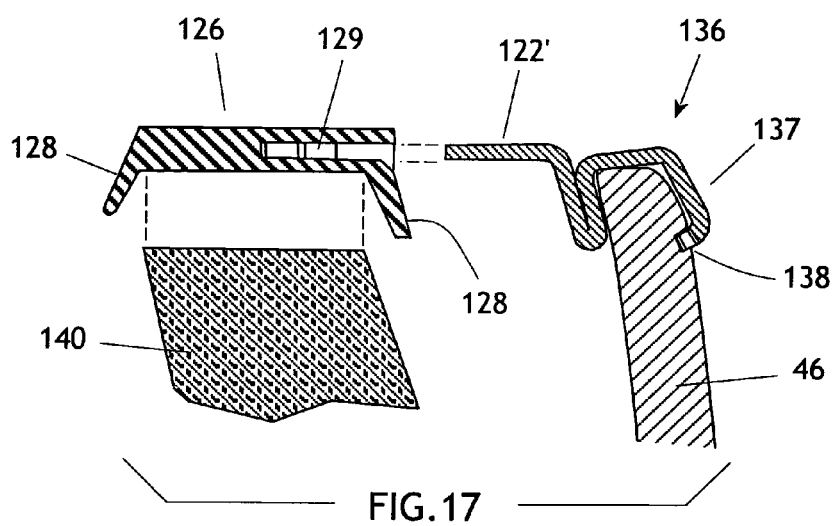
FIG. 17 is an exploded cross-sectional elevation showing the bracket component assembly with a clamping fastener of FIG. 16.
Figure 18:
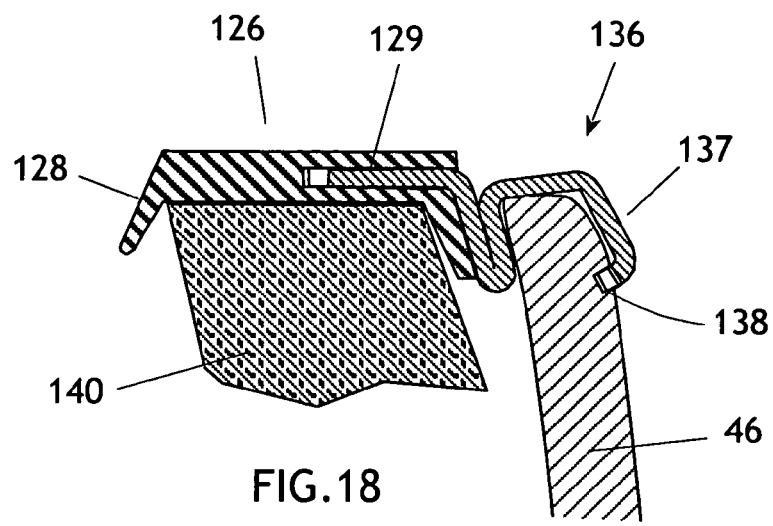
FIG. 18 is a cross-sectional elevation showing the bracket component assembled with a clamping fastener of FIG. 16.

With regard to FIGS. 16-18, the bracket 126 may be employed with other devices that may be joined to the filter lens of the clip-on accessory. For example, a clamping fastener 136 is formed of a strip of metal or other hard material, and includes the tab structure 122 described previously. The tab 122' extends integrally from an inverted U-shaped conformation 137 that defines an incisor edge 138 confronting an anvil portion 141. The incisor edge includes a pair of sharpened teeth 138 that extend slightly into the gap of the conformation 137. As shown particularly in FIG. 17, the fastener 136 is designed to engage the edge portion of a plastic filter lens 46 by receiving the edge portion in the gap of the conformation 137, and squeezing the toothed edge 138 and 139 toward the anvil 141. The teeth 139 are driven into the plastic lens to tightly grip the lens and form a permanent attachment thereto. The bracket 126 is then assembled to the tab 122', enabling the clip-on accessory to be releasably secured by the bracket 126 to the edge of spectacles 140 (framed or rimless), as shown in FIG. 18. This embodiment takes advantage of the bracket 126 but eliminates the need to drill holes in the lens 46, resulting in less time required for assembly of the clip-on accessory.

Figure 19:
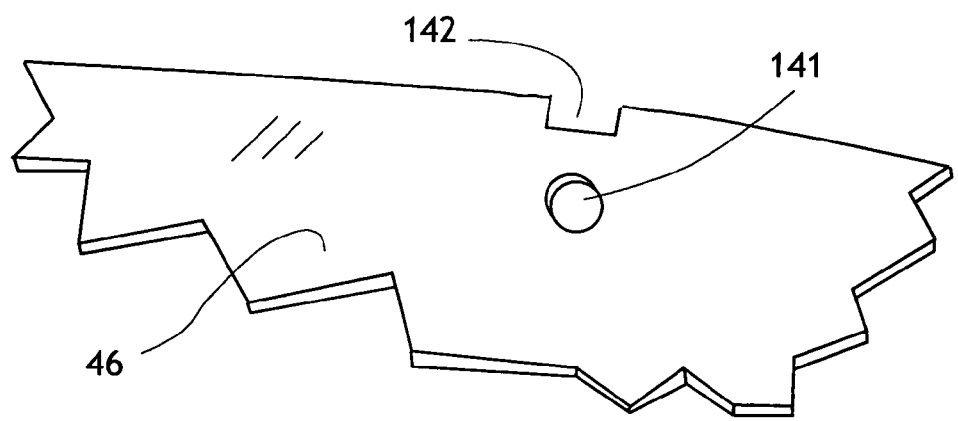
FIG. 19 is a fragmentary view of a filter lens depicting another embodiment of the invention.

In a further embodiment of the invention, the clasp 21 or 121 may be modified to provide only one post 31 extending from the T portion 28. As shown in FIG. 19, the filter lens 46 is provided with a single hole 141 to receive the post 31. In addition, a notch 142 is formed in the edge of the lens 46 adjacent to the hole 141 and sized to accommodate the proximal portion of the tongue 22. The fastener 41 is similarly modified to accept a single post 31, so that the clasp may be joined to the lens 46 as described previously. However, in this embodiment the rigidity of the engagement is provided by the proximal portion of the tongue seated in the notch 142. Note that any of the previous embodiments may include the notch 142 to accept the proximal portion of the tongue or tab, and may employ one post 31 or more than two posts, without departing from the teachings of the invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a customized clip-on accessory for superimposing auxiliary lenses on the corrective lenses of a pair of spectacles, the combination including:

a pair of auxiliary lenses trimmed to have perimeters that conform substantially with the outer periphery of the spectacle portions that contain the corrective lenses; said auxiliary lenses each having an outer objective surface and an opposed inner surface;

a bridge member extending between said auxiliary lenses and having a length selected to maintain said auxiliary lenses in registration with the corrective lenses;

a plurality of clasps, each secured to one of a plurality of edge portions of said auxiliary lenses, each clasp including a proximal portion having at least one post projecting therefrom and a tongue extending distally from said proximal portion; said proximal portion impinging on said objective surface of the respective auxiliary lens, and said plurality of clasps being free of any impingement on said inner surfaces of said auxiliary lenses;

a plurality of fastener members, each including a plate and at least one protuberance extending from said plate and having a bore therethrough dimensioned to receive one of said posts; said plate impinging on said inner surface of a respective auxiliary lens;

at least one mounting hole placed through each of said edge portions of said auxiliary lenses, said mounting hole dimensioned to receive said protuberance therein;

means for permanently securing said post in said bore, whereby said clasp is rigidly affixed to said auxiliary lens;

said tongue including a distal end having means for releasably engaging a peripheral portion of said spectacles to secure said clip-on accessory to said spectacles.

2. The customized clip-on accessory of claim 1, wherein said bridge includes opposed ends, and means for securing a pair of said clasps at said opposed ends of said bridge.

3. The customized clip-on accessory of claim 1, wherein said means for permanently securing said post in said bore includes at least one annular flange formed on said post and tapered in barb-like fashion, said annular flange enabling insertion of said post in said bore but preventing withdrawal therefrom.

4. The customized clip-on accessory of claim 1, wherein said means for releasably engaging a peripheral portion of said spectacles includes a reduced-width waist portion of said tongue to facilitate bending and trimming a distal portion of said tongue to grip said peripheral portion of said spectacles.

5. The customized clip-on accessory of claim 4, further including a sleeve secured to said distal portion of said tongue and disposed to impinge on said peripheral portion of said spectacles.

6. The customized clip-on accessory of claim 1, wherein each clasp includes a front plate having a T-shape, and a pair of said posts extending distally from said front plate parallel to each other, said fastener member including a pair of protuberances having a pair of bores spaced apart and oriented to receive said pair of posts.

7. The customized clip-on accessory of claim 6, wherein said posts are dimensioned to extend through said bores and protrude distally therefrom, said posts having protruding portions that are trimmed and removed.

8. The customized clip-on accessory of claim 1, wherein said means for releasably engaging a peripheral portion of said spectacles includes a tab conformation at said distal end of said tongue.

9. The customized clip-on accessory of claim 8, wherein said tab conformation includes a reduced width portion at said distal end of said tongue, and a pair of detent lugs extending laterally from said reduced width portion.

10. The customized clip-on accessory of claim 9, further including a bracket member, said bracket member including a pair of opposed flanges disposed to engage said peripheral portion of said spectacles, and means for engaging said tab conformation of said tongue of said clasp.

11. In a customized clip-on accessory for superimposing auxiliary lenses on the corrective lenses of a pair of spectacles, the combination including:

a pair of auxiliary lenses trimmed to have perimeters that conform substantially with the outer periphery of the spectacle portions that contain the corrective lenses;

a bridge member extending between said auxiliary lenses and having a length selected to maintain said auxiliary lenses in registration with the corrective lenses;

a plurality of clasps, each secured to one of a plurality of edge portions of said auxiliary lenses, each clasp including a proximal portion having at least one post projecting therefrom and a tongue extending distally from said proximal portion;

a plurality of fastener members, each including a plate and at least one protuberance extending from said plate and having a bore therethrough dimensioned to receive one of said posts;

at least one mounting hole placed through each of said edge portions of said auxiliary lenses, said mounting hole dimensioned to receive said protuberance therein;

means for permanently securing said post in said bore, whereby said clasp is rigidly affixed to said auxiliary lens;

said tongue including a distal end having means for releasably engaging a peripheral portion of said spectacles to secure said clip-on accessory to said spectacles;

said means for releasably engaging a peripheral portion of said spectacles including a tab conformation at said distal end of said tongue;

said tab conformation including a reduced width portion at said distal end of said tongue, and a pair of detent lugs extending laterally from said reduced width portion;

a bracket member, said bracket member including a pair of opposed flanges disposed to engage said peripheral portion of said spectacles, and means for engaging said tab conformation of said tongue of said clasp;

said means for engaging said tab conformation of said tongue including a slot extending in said bracket member, said slot including openings to snap-engage said detent lugs of said tab conformation.

12. The customized clip-on accessory of claim 11, wherein said bracket member includes a bar-like body having one end into which said slot extends.

13. In a customized clip-on accessory for superimposing auxiliary lenses on the corrective lenses of a pair of spectacles, the combination including:

a pair of auxiliary lenses and a bridge member extending between said auxiliary lenses and having a length selected to maintain said auxiliary lenses in registration with the corrective lenses;

a plurality of clasps, each secured to one of a plurality of edge portions of said auxiliary lenses, each clasp including a proximal portion having at least one post projecting therefrom and a tongue extending distally from said proximal portion;

a plurality of fastener members, each including a bore therethrough dimensioned to receive one of said posts;

at least one mounting hole placed through each of said edge portions of said auxiliary lenses and said at least one post extending therethrough;

means for permanently securing said post in said bore, whereby said clasp is rigidly affixed to said auxiliary lens;

a bracket member having a bar-like body supporting a pair of opposed flanges disposed to releasably engage a peripheral portion of said spectacles, and a slot extending in said bar-like body;

said tongue including a distal end portion dimensioned to be received in said slot opening, said slot including openings to snap-engage said distal end portion.

* * * * *